3,211,444
HYDRAULIC DAMPER

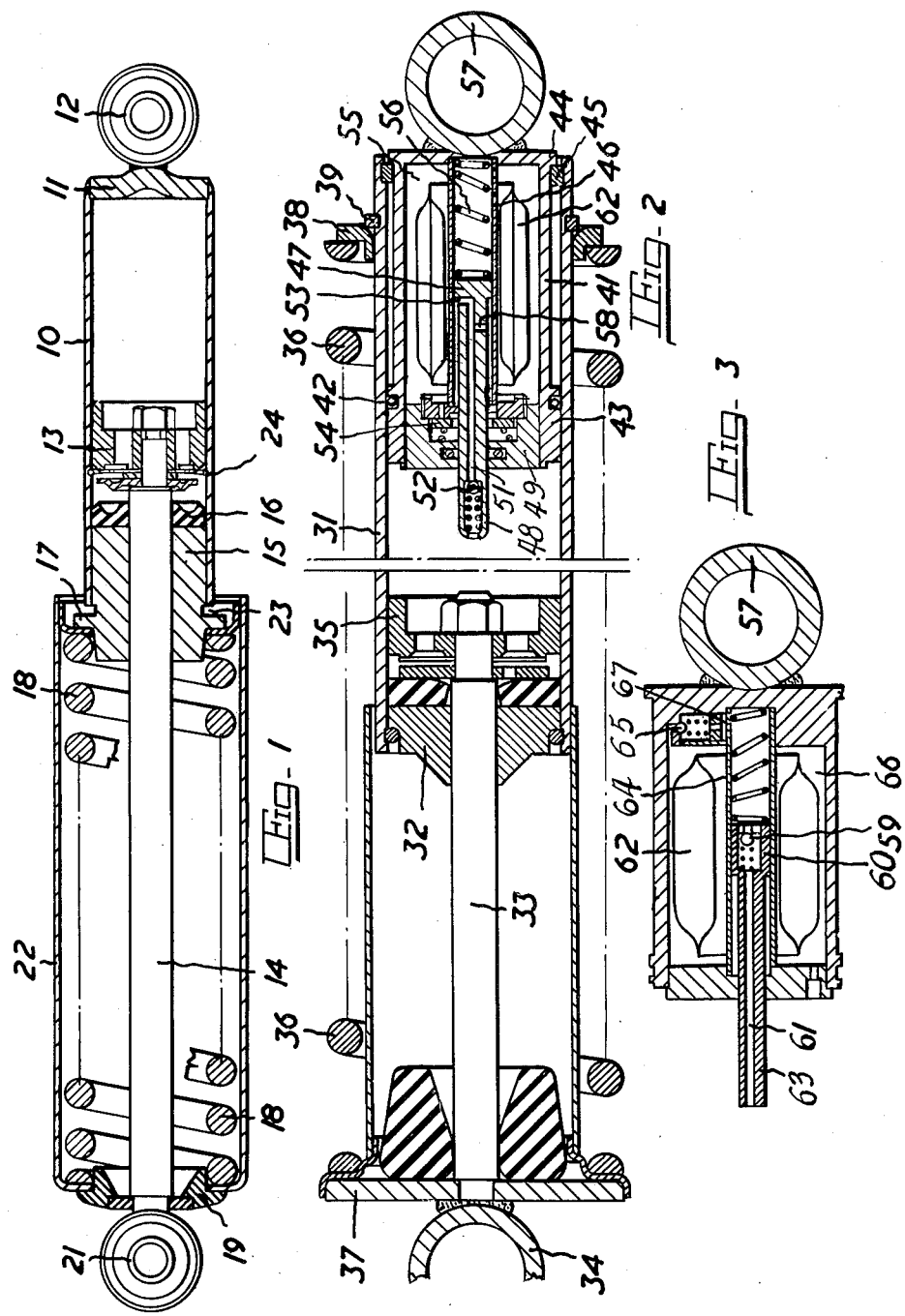

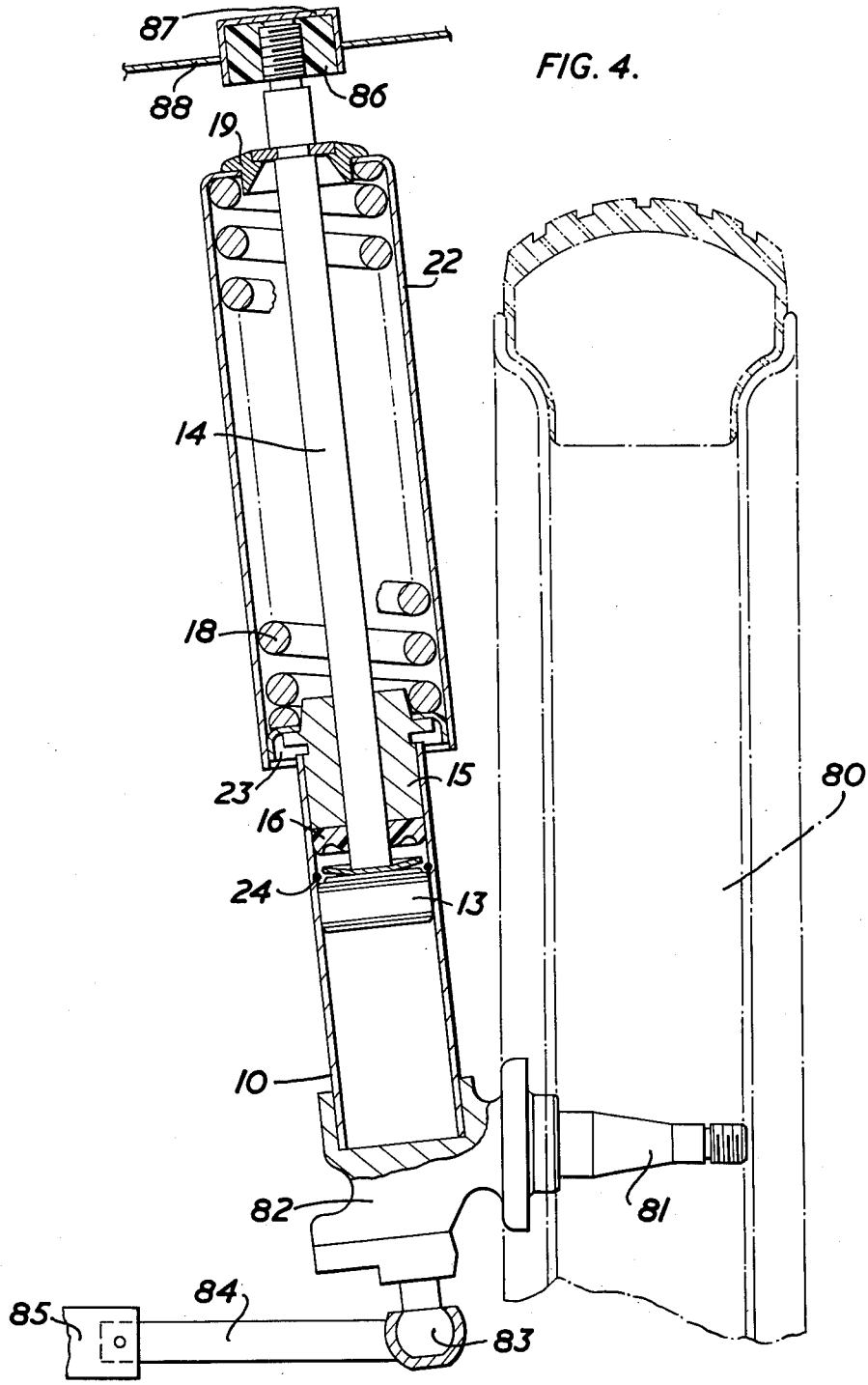

David Alan Avner, Coventry, England, assignor to Girling Limited, Tyseley, Birmingham, England, a British company
Filed Dec. 17, 1962, Ser. No. 245,030
Claims priority, application Great Britain, Dec. 16, 1961, 45,180/61; Mar. 3, 1962, 8,318/62
7 Claims. (Cl. 267—8)

This invention relates to an improved hydraulic damper or suspension unit of the telescopic kind in which damping is produced by the restricted flow of liquid between opposite ends of a cylinder in which works a piston carried by a piston rod extending through one end of the cylinder.

In a damper of this kind, provision has to be made to accommodate the changes in volume due to variations in the length of piston-rod within the cylinder when there is relative axial movement between the piston and cylinder. Normally a reservoir surrounding or located adjacent to the cylinder is connected to the cylinder through a valve or valves permitting controlled flow of liquid between the cylinder and the reservoir.

According to our invention, in a telescopic damper or suspension unit comprising a piston working in a cylinder and carried by a piston rod working through an end closure for the cylinder, one end of the cylinder is axially movable against resilient or other loading to take care of changes in volume due to movements of the piston rod into and out of the cylinder. The cylinder can thus be completely filled with liquid so that frothing is avoided, and the cost and complication of a separate reservoir and valves are eliminated.

This unit may act solely as a damper for a vehicle suspension incorporating any convenient form of springing, in which case the damper can be connected between sprung and unsprung parts of the vehicle and the axially movable end of the damper cylinder can be loaded by a part of the weight of the vehicle.

Alternatively, the damper may be combined with any convenient type of spring to form a suspension unit for a vehicle, and it may incorporate means for maintaining the body of the vehicle at a substantially constant level.

Two embodiments of our invention are illustrated by way of example in the accompanying drawings in which:

FIGURE 1 is a longitudinal section of a suspension unit for a light vehicle such as a motor cycle or scooter, the unit incorporating an hydraulic damper;

FIGURE 2 is a longitudinal section of a suspension unit for a car or like vehicle embodying self-levelling means;

FIGURE 3 is a fragmentary section showing a modified form of the self-levelling means shown in FIGURE 2; and FIGURE 4 is a view showing the suspension unit illustrated in FIGURE 1 forming a king-pin about which a front wheel of a vehicle is angularly movable for steering.

In the unit shown in FIGURE 1, a damper cylinder 10 is closed at one end by a fixed closure member 11 carrying an eye 12 for attaching it to an unsprung part of a vehicle such as a wheel axle or spindle. A piston 13 working in the cylinder is provided in the known manner with valves and/or restrictors controlling the flow of liquid through the piston in both directions. The resistance to flow will normally be greater in one direction than the other.

The piston is mounted on the inner end of a piston rod 14 working through an axial bore in a bush 15 which is axially slidable in the open end of the cylinder. The bush carries at its inner end a high pressure seal 16 co-operating with the piston rod and with the inner surface of the cylinder so that the bush forms both a seal and a guide for the piston rod.

The bush 15 extends beyond the end of the cylinder and adjacent to its outer end there is an annular shoulder 17 forming an abutment for one end of a coiled compression spring 18 surrounding the piston rod and bearing at its other end on an annular abutment 19 fixed on the piston rod adjacent to its outer end. At its extremity the piston rod carries an eye 21 for attachment to the frame or other sprung part of the vehicle.

The spring is enclosed by a cylindrical dust-shield 22 clamped at its outer end against the abutment 19 by the spring. The dust-shield extends inwardly over the exposed end of the bush 15 and a part of the adjacent end of the cylinder and is guided by a flexible annular seal 23 clamped against the shoulder 17 by the spring and engaging the inner surface of the dust-shield.

A circlip 24 located in an internal annular groove in the damper cylinder 10 forms a stop for the piston limiting the axial extension of the unit.

The cylinder 10 is initially filled with oil or other liquid at atmospheric pressure, and when the spring 18 is fitted it applies an axially directed force to the bush 15 to maintain the liquid in the cylinder under pressure.

When the unit is in position between sprung and unsprung parts of a vehicle, the load is resiliently supported by the spring and the damper damps the suspension movements.

The coiled compression spring 18 may be replaced by a rubber, air or any other convenient form of spring.

Where a damper only is required, the piston rod may work through a fixed closure for one end of the cylinder, the other end being closed by an axially movable plunger or block which is in sliding and sealing engagement with the cylinder and is loaded by a spring or other resilient means.

In the suspension unit shown in FIGURE 2, a cylinder 31 is closed at one end by a fixed closure 32 through which works a piston rod 33 having at its outer end an eye 34 for attachment to the body of a vehicle. The inner end of the piston rod is secured in a piston 35 working in the cylinder and incorporating valves and/or restrictors for controlling the flow of liquid through the piston in both directions.

A load-supporting compression spring 36 fits over the cylinder and piston rod and abuts between a collar 37 fixed on the piston rod adjacent to its outer end and a flanged ring 38 mounted on the cylinder and backed by a circlip 39. The end of the cylinder remote from the fixed closure 32 is closed by a hollow sleeve 41 which is adapted to slide axially in the cylinder and is sealed by an O ring 42 or other seal located in an annular groove in a radially projecting flange 43 on the inner end of the sleeve which is a sliding fit in the cylinder. There is another radially projecting flange 44 at the outer end of the sleeve, and a circlip or spring ring 45 located in an annular groove in the cylinder co-operates with the flanges 43 and 44 to limit the axial movement of the sleeve in both directions.

A tube 46 is mounted axially in the sleeve and a piston 47 working in the tube has a piston rod 48 extending through a closure 49 for the inner end of the sleeve. An axial passage 51 in the piston rod is controlled by a one-way valve 52 opening towards the cylinder, and the inner end of the passage communicates by way of a radial port 53, the annular space around the piston rod, and a one-way valve 54 with a reservoir 55 formed by the annular space between the tube 46 and the outer wall of the sleeve. The piston 47 is loaded by a spring 56. The outer end of the sleeve 41 carries an eye 57 for attachment to an axle or other unsprung part of the vehicle.

The piston 47 is shown in an intermediate position in the tube 46, but in the fully extended condition of the unit the spring 56 urges the piston into engagement with the end closure 49 of the sleeve.

On contraction of the unit under load, the inner end of the piston rod 48 is engaged by the inner end of the piston rod 33 and the piston 47 is moved axially in the tube 46 against the action of the spring 56 so that liquid is drawn from the reservoir 55 through the one-way valve 54 into the annular space around the piston rod 48 as the volume of that space increases. On extension of the unit, the spring 56 moves the piston 47 in the opposite direction to force liquid from the annular space around the piston rod through the port 53, passage 51, and valve 52 into the cylinder 31 to increase the volume of liquid in the cylinder and hence to increase the effective length of the unit. This action is continued by relative axial movement between the piston 35 and cylinder 31 due to suspension movements of the vehicle until the unit has been extended to such a length that a radial relief port 58 in the piston rod 48 in communication with the axial passage 51 passes out through the clossure 49.

If the vehicle loading is increased, the unit is contracted and further liquid is drawn from the reservoir 55 and pumped into the cylinder 31 until the unit has been extended again to bring the body of the vehicle up to a predetermined level.

In FIGURE 3 is shown a modified construction of the sleeve 41 in FIGURE 2 in which a one-way valve 59 is located in a piston 60 at the inner end of a passage 61 in a piston rod 63 for the piston 60 and a tube 64 in which works the piston 60 is in communication by way of a port 67 in the tube and a one-way valve 65 with a reservoir 66 so that pumping takes place on the compression stroke with inward movement of the sleeve into the cylinder.

In both arrangements, a flexible bag 62 filled with air or other gas is located in the reservoir 55 to take care of changes in the volume of liquid in the reservoir.

As illustrated in FIGURE 4 the suspension unit illustrated in FIGURE 1 may form the king-pin about which a front wheel 80 of a vehicle is angularly movable for steering. The hydraulic fluid in the unit acts as a bearing and relative angular movement can occur between the cylinder 10 and the bush 15 and piston 13. The load on the wheel 80 is taken by the hydraulic fluid in conjunction with the spring 18, and there is no need for the usual separate thrust bearing.

The unit is mounted with its axis substantially vertical and a stub axle 81 for the wheel 80 is carried by or forms part of a bracket 82 rigidly fixed on the cylinder 10 adjacent to its lower end. The lower end of the cylinder is mounted by means of a ball joint 83 on the outer end of a radius link 84 of which the inner end is pivotally mounted on a bracket 85 on the chassis of the vehicle.

The upper end of the piston rod 14 is mounted in a rubber bush or block 86 in a socket 87 on the vehicle body or chassis 88, the rubber permitting angular movement of the piston rod and occupying the position of the usual thrust bearing.

I claim:

1. A telescopic hydraulic suspension unit for vehicles comprising a cylinder wholly filled with liquid, an end closure for each end of the cylinder, one of said end closures being slidably mounted for axial movement in and relative to the cylinder and the other of said end closures being fixed, a piston working in the cylinder, a piston rod attached to the piston and working through and in fluid-tight engagement with said axially movable end closure, means carried by the piston rod and by said fixed end closure for connecting the damper between sprung and unsprung parts of a vehicle and a spring interposed between abutments on the piston rod and the axially movable end closure.

2. A suspension unit for vehicles, comprising a chamber wholly filled with liquid and formed by a cylinder, a first end closure wall rigidly secured to one end of the cylinder, a second end closure wall reciprocably movable in and in fluid-tight engagement with the other end of the cylinder, a piston working in said chamber, a piston rod secured to the piston and working through and in fluid-tight engagement with a co-axial bore in said second wall, means within said chamber and independent of said second wall for limiting the axial movement of said piston away from said first wall, a suspension spring interposed between an abutment on the piston rod at an end remote from said chamber and an abutment on said second wall, and attachment means on said rod abutment end and said first wall end for connecting the unit between the sprung and unsprung parts of the vehicle.

3. A telescopic hydraulic suspension unit for vehicles comprising a cylinder wholly filled with liquid, an end closure sealing each end of said cylinder, one of said end closures being fixed relative to said cylinder and the other of said end closures being slidably mounted for axial movement relative to said cylinder, a piston working in said cylinder, a piston rod attached to said piston and working through and in fluid-tight engagement with said slidably mounted axially movable end closure, means carried by said piston rod and said fixed end closure for connecting said unit between sprung and unsprung parts of a vehicle, abutments on said piston rod and said slidably mounted axially movable end closure, and an external suspension spring to support part of the weight of the vehicle interposed between said abutments on said piston rod and said slidably mounted axially movable end closure.

4. A telescopic hydraulic suspension unit for vehicles comprising a cylinder wholly filled with liquid, an end closure sealing each end of said cylinder, one of said end closures being fixed in said cylinder and the other of said end closures being slidably mounted for axial movement in and relative to said cylinder, a piston working in said cylinder, a piston rod attached to said piston and working through and in fluid-tight engagement with said fixed, end closure, means carried by said piston rod and said slidably mounted axially movable end closure for connecting said unit between sprung and unsprung parts of a vehicle, abutments on said piston rod and said cylinder, and an external suspension spring to support part of the weight of the vehicle interposed between said abutments on said piston rod and said cylinder.

5. A telescopic hydraulic suspension unit for vehicles comprising a cylinder wholly filled with liquid, an end closure sealing each end of said cylinder, one of said end closures being fixed in said cylinder and the other of said end closures being slidably mounted for axial movement in and relative to said cylinder, a piston rod attached to said piston and working through and in fluid-tight engagement with said fixed end closure, means carried by said piston rod and said slidably mounted axially movable end closure for connecting said unit between sprung and unsprung parts of a vehicle, abutments on said piston rod and said cylinder, an external suspension spring to support part of the weight of the vehicle interposed between said abutments on said piston rod and said cylinder, a reservoir in said slidably mounted axially movable end closure, and means actuated by relative axial movement between said slidably mounted axially movable end closure and the cylinder for drawing liquid from the reservoir and pumping it into the cylinder until the unit has been extended to a predetermined length.

6. In a vehicle, a suspension assembly for a front wheel of the vehicle comprising a king-pin of which the axis is generally vertical, the king-pin being connected between the front wheel and the chassis of the vehicle and defined by a telescopic hydraulic suspension unit comprising a cylinder, hereinafter called said first member, wholly filled with liquid, an end closure sealing each end of said first member, one of said end closures being fixed relative to said first member and the other of said end closures and said first member being slidably movable in an axial direction relative to each other, a piston working in said first member and a piston rod attached to the piston and working through and in fluid-tight engagement with one of said end closures hereinafter called said second member, abutments on said piston rod and one of said first and second members, an external suspension spring interposed between said abutments, a stub axle for the front wheel of the vehicle connected to the end closure at the end of the first member remote from said piston rod, a radius link pivotally mounted at its inner end on the chassis of the vehicle, a ball on the outer end of the radius link on which is mounted the end closure at the end of the first member remote from said piston rod, and a rubber bush in a socket on the chassis of the vehicle in which is mounted the piston rod at its end remote from said first member.

7. A telescopic hydraulic suspension unit for vehicles comprising a cylinder wholly filled with liquid, an end closure sealing each end of said cylinder, one of said end closures being fixed relative to said cylinder and the other of said end closures being slidably mounted for axial movement relative to said cylinder, a piston working in said cylinder, a piston rod attached to said piston and working through and in fluid-tight engagement with said slidably mounted axially movable end closure, means carried by said piston rod and said fixed end closure for connecting said unit between sprung and unsprung parts of a vehicle, abutments on said piston rod and said slidably mounted axially movable end closure, an external suspension spring to support part of the weight of the vehicle interposed between said abutments on said piston rod and said slidably mounted axially movable end closure, and stop means in the cylinder against which said piston is adapted to abut to limit axial extension of the unit.

References Cited by the Examiner

UNITED STATES PATENTS

| | | | |
|---|---|---|---|
| 2,660,449 | 11/53 | MacPherson | 267—8 X |
| 2,673,731 | 3/54 | Patriquin | 188—100 |
| 2,856,035 | 10/58 | Rohacs | 188—100 X |
| 2,860,733 | 11/58 | Muller | 188—100 |
| 3,027,152 | 3/62 | Deschner | 267—1 |
| 3,070,363 | 12/62 | Ellis | 188—100 |
| 3,117,800 | 1/64 | Magnusson | 267—8 X |

FOREIGN PATENTS

| | | |
|---|---|---|
| 908,102 | 4/54 | Germany. |
| 530,936 | 7/55 | Italy. |

ARTHUR L. LA POINT, *Primary Examiner.*

A. HARRY LEVY, *Examiner.*